Figure 1:
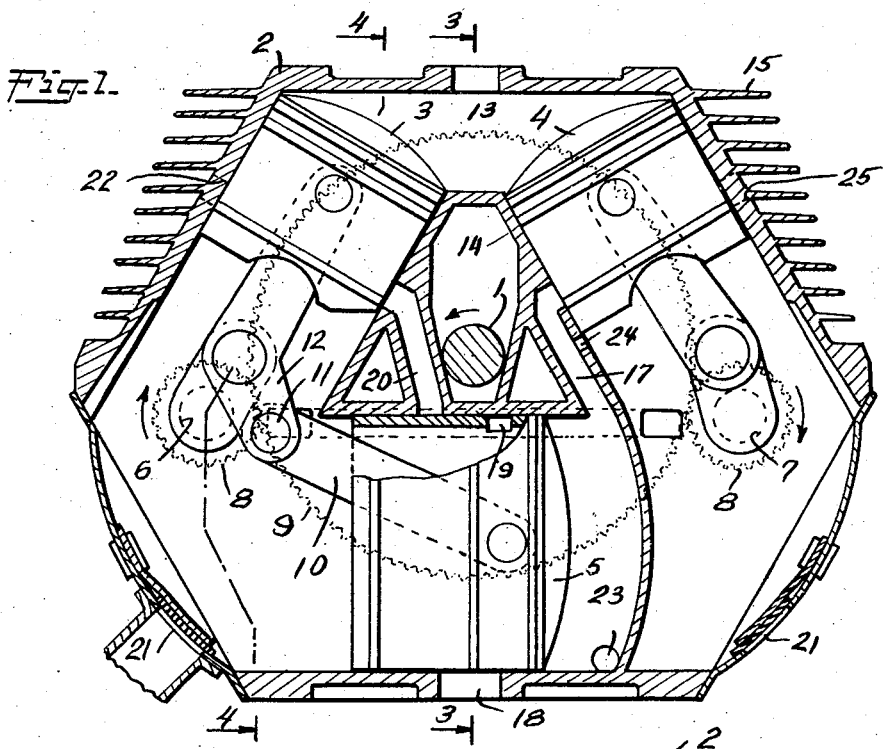

Sept. 27, 1927.  
E. JUNGE  
1,643,581  
INTERNAL COMBUSTION ENGINE  
Filed Aug. 29, 1924  
3 Sheets-Sheet 1

INVENTOR  
BY  
ATTORNEYS

Sept. 27, 1927.  1,643,581
E. JUNGE
INTERNAL COMBUSTION ENGINE
Filed Aug. 29, 1924    3 Sheets-Sheet 2
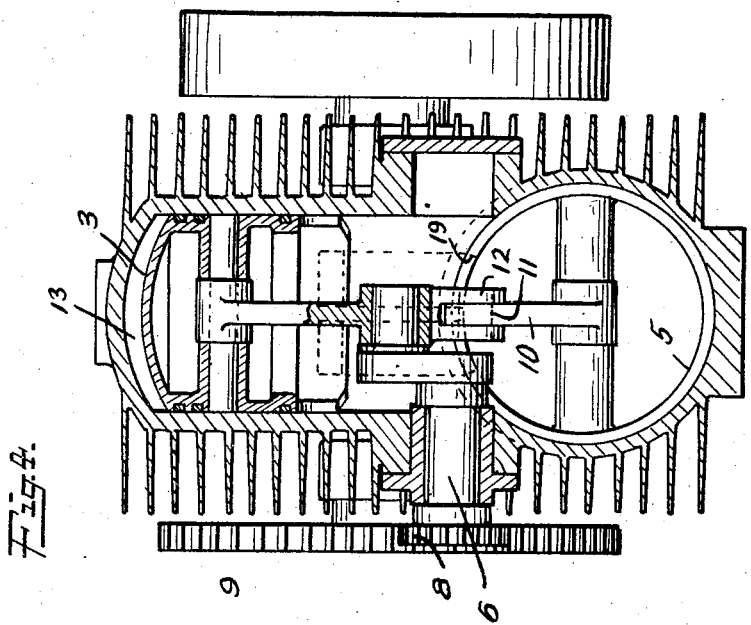
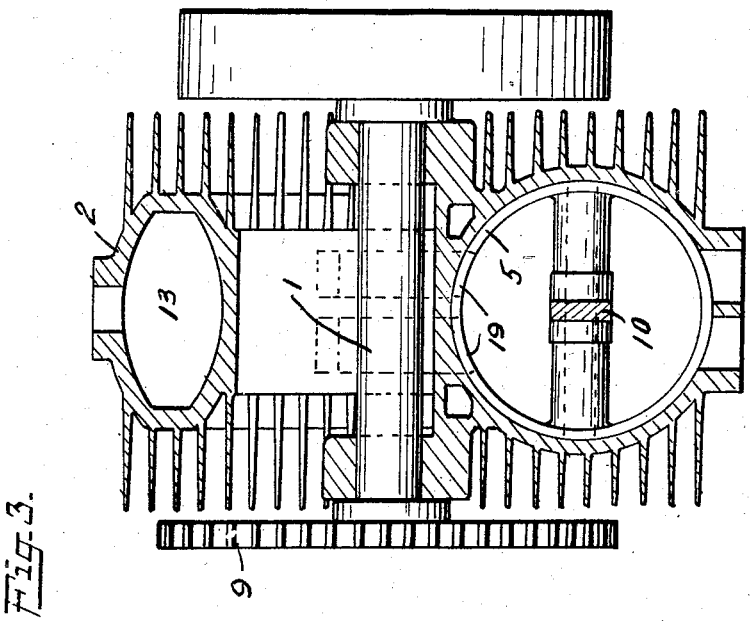
INVENTOR
Erich Junge
BY
Pennie, Davis, Marvin & Edmonds
ATTORNEYS Sept. 27, 1927.  E. JUNGE  1,643,581
INTERNAL COMBUSTION ENGINE
Filed Aug. 29, 1924  3 Sheets-Sheet 3
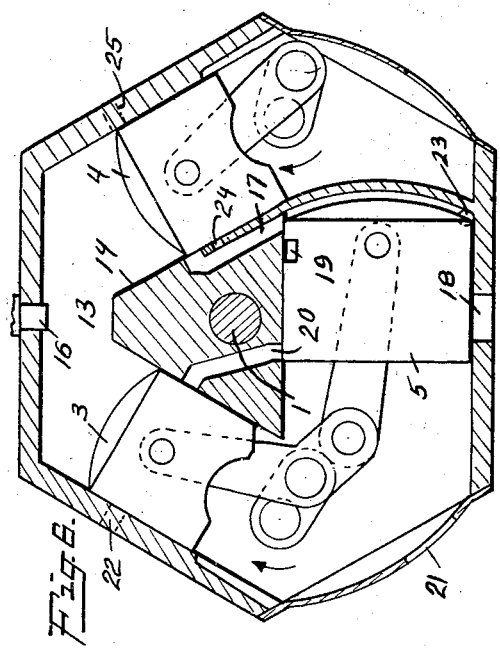
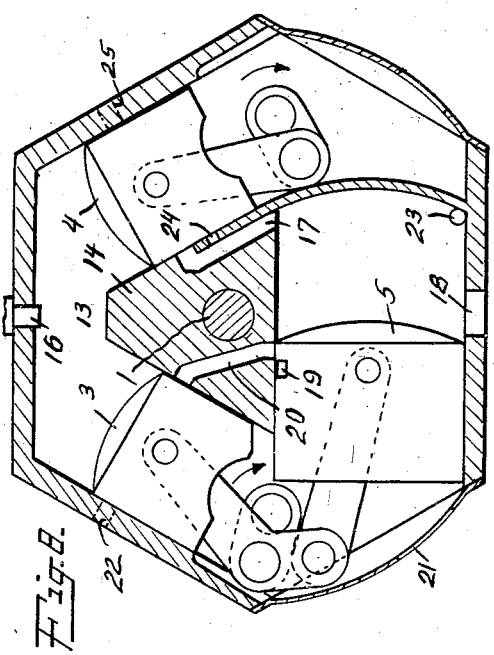
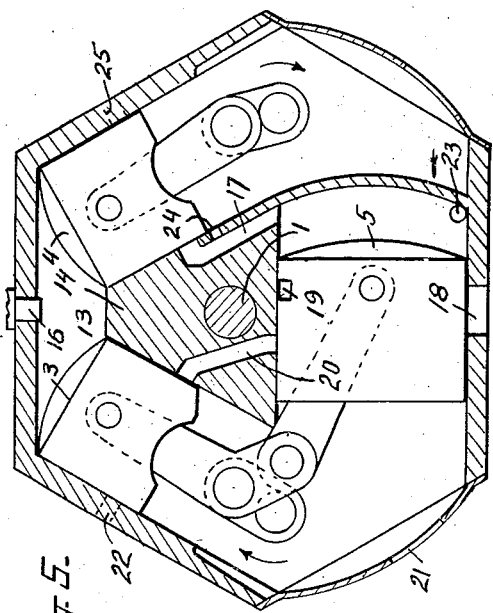
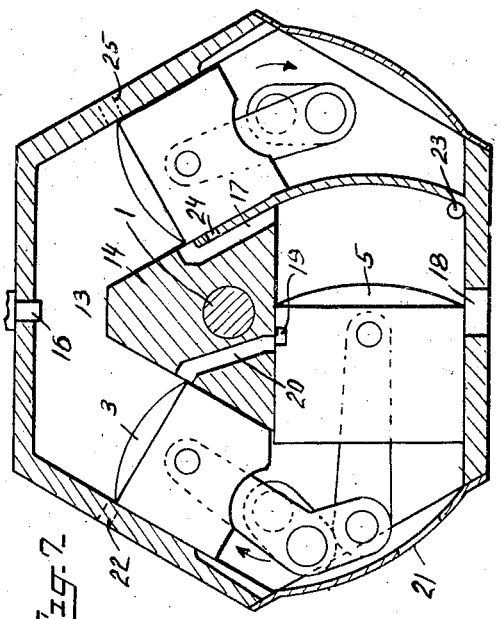
INVENTOR
Erich Junge
BY
ATTORNEYS Patented Sept. 27, 1927.

1,643,581

UNITED STATES PATENT OFFICE.

ERICH JUNGE, OF STATEN ISLAND, NEW YORK.

INTERNAL-COMBUSTION ENGINE.

Application filed August 29, 1924, Serial No. 734,863, and in Germany October 19, 1923.

The present invention relates to an internal combustion engine and has for its object to provide an engine which combines extreme simplicity and consequent low cost of manufacture with maximum efficiency of operation and maximum power output for an engine of given weight. These advantages are obtained chiefly by providing a plurality of cylinders interconnected to cooperate in such fashion as to afford efficient and economical operation and physically disposed with respect to each other so as to utilize a common combustion space and a common crank case.

In its preferred form the engine has three cylinders in which three pistons are arranged to operate in synchronous relation. The pistons serve both to transmit the power impulses of the engine to the crank shaft and to deliver the combustible medium to the combustion chamber and subsequently exhaust the spent products of combustion from the engine. Two of the cylinders are the principal power developing cylinders of the engine and these cylinders are in direct communication with a single combustion space. Under certain conditions of operation the third cylinder may also be used as a power developing cylinder or it may be employed merely for the purpose of introducing an additional air charge into the principal combustion space to thereby permit the burning of a larger amount of fuel at each explosion. In the case where the third cylinder is employed as a power developing cylinder the partially spent products of combustion in the main combustion chamber are vented into the third cylinder as the two principal power developing pistons approach the ends of their strokes. At this stage of the cycle the third piston is just beginning its receding stroke and the result is that further expansion of the partially spent gases from the main combustion chamber will serve to deliver power to the third piston and thus augment the principal power impulses derived from the two main cylinders. With this arrangement the products of combustion are expanded down to atmospheric pressure and a notable fuel economy is effected while the power output is increased accordingly.

The maximum power output from the engine may be obtained by employing the third cylinder for the purpose of introducing an additional air charge to the principal combustion chamber. This is accomplished by causing the engine to rotate in the opposite direction. With this arrangement the main combustion chamber receives an air charge of normal size augmented by a charge of compressed air derived from the third cylinder, with the result that the amount of available oxygen introduced into the combustion chamber is materially increased, thus permitting the burning of a substantially larger amount of fuel at each explosion. This method of operation makes for maximum power output while the manner of operation above described, namely, employing all three cylinders as power developing cylinders, makes for maximum economy.

The invention contemplates an extremely simple engine construction by means of which the above described advantages are secured in a machine which may be manufactured at very low cost. The construction involves the grouping of the three cylinders about a center space of generally triangular conformation. This center space contains the various passages and openings through which the respective cylinders are interconnected in proper timed relation during operation of the engine. The pistons reciprocate along the respective sides of the center triangular space. This particular arrangement permits of the interconnection of the various cylinders to provide for the most effective operation of the engine and at the same time affords a mechanical construction of extreme ruggedness and simplicity without the use of valves.

Figure 2:
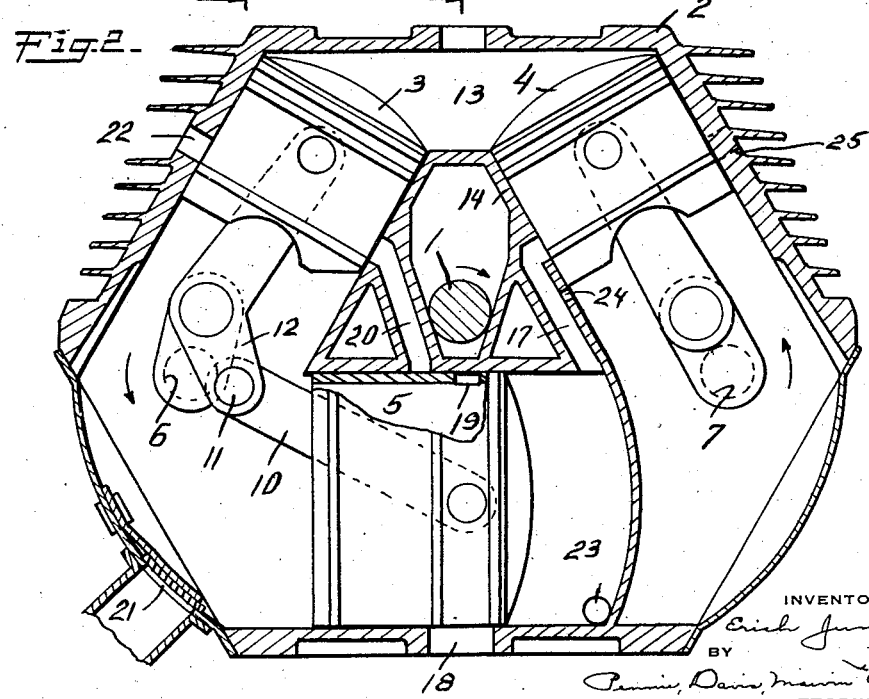

I have illustrated my invention in the accompanying drawings, in which Figure 1 is a transverse sectional view illustrating an internal combustion engine embodying the invention designed for maximum economy of operation; Figure 2 is a similar view of a slightly modified form of engine adapted for giving a maximum power output; Figure 3 is a sectional view taken on line 3—3 of Figure 1; Figure 4 is a sectional view taken on line 4—4 of Figure 1; and Figures 5 to 8 inclusive are diagrammatic views showing the positions of the various parts of the engine at different points in its cycle of operation.

Referring to the drawings, particularly to Figures 1 to 4, 1 indicates the centrally positioned main driving shaft of the engine. The engine parts are enclosed within the housing 2. The pistons 3, 4 and 5 operate respectively in the three cylinders formed within the housing 2 and constitute the power developing units of the apparatus. The pistons 3 and 4 are the principal power developing pistons and are connected respectively to crank shafts 6 and 7. These respective crank shafts carry gears or pinions 8 which in turn mesh with a large gear 9 provided on the main driving shaft 1 and thus serve to effect rotation of the main shaft 1 at reduced speed. In automobile and aeroplane motors the crank shafts 6 and 7 are commonly operated at speeds of from three thousand to four thousand revolutions per minute and for this reason it is desirable that the speed reduction gearing as described be interposed between the crank shafts and the main driving shaft 1 of the engine. The third piston 5 is operated in synchronism with the pistons 3 and 4 through the medium of its connecting rod 10 which is pivotally connected at 11 with the portion 12 extending out from the connecting rod of the piston 3. The pistons 3 and 4 are arranged to reciprocate substantially in unison while the relation of the piston 5 to the other pistons is such that it accomplishes the major portion of its stroke during the time at which the pistons 3 and 4 are passing through the extremities of their strokes.

The principal combustion chamber of the engine is indicated at 13. This combustion space is in direct communication with both pistons 3 and 4 and, upon ignition of the charge in the combustion space, the pressure of the expanding gases is exerted directly upon both of these pistons and tends to move them simultaneously downwardly in their respective cylinders. The center part of the engine unit, indicated generally at 14 consists of a portion of generally triangular conformation which contains various passages serving to interconnect the respective cylinders and which also houses the main driving shaft 1. Each of the three outer faces of the center portion 14 constitutes a wall of one of the cylinders so that the three cylinders are grouped in triangular relation about the center portion. It is this arrangement and manner of construction that gives to the apparatus its extreme simplicity and permits of the economy and flexibility of operation which is characteristic of the engine.

The operation of the engine is illustrated by the diagrammatic views of Figures 5 to 8 inclusive. In the figures as shown the main engine shaft 1 rotates in a counter-clockwise direction. In the position indicated in Figure 5, the two pistons 3 and 4 are at the uppermost extent of their strokes and the charge of combustible mixture is compressed within the combustion chamber 13. Unless the Diesel process is employed, ignition is effected in the ordinary manner through the medium of a spark plug 16 whereupon the resulting expansion of the burned gases forces the pistons 3 and 4 downwardly. In the position shown in Figure 6, the piston 4 which travels slightly in advance of piston 3, as shown, has just reached a point where it uncovers the exhaust port 17 provided in the center triangular portion 14 lying between the respective cylinders. At this point piston 5 has reached the right hand extremity of its stroke, and the gases passing from the combustion chamber 13 through port 17 enter behind piston 5 and impart to it a power impulse.

As operation of the engine continues, the parts assume the positions indicated in Figure 7. At this point piston 5 has uncovered the exhaust port 18 with the result that the gases from the combustion chamber 13 and from all three of the cylinders are vented to atmosphere. During the movement of the various pistons from the positions shown in Figures 5 and 6 to that of Figure 7, the air entrapped within the crank case space of the housing has been compressed, and upon movement of piston 5 into the position indicated in Figure 7, this compressed air passes through a slot or port 19 in the piston 5 and issues into the combustion chamber 13 through the medium of port 20. In this manner scavenging of the combustion chamber is accomplished, since the inrushing fresh air charge enters behind the spent gases of combustion and forces them out through port 17 and exhaust port 18. Upon movement of the pistons into the position indicated in Figure 8, ports 17 and 20 are both closed and the upward travel of the pistons 3 and 4 subjects the charge in the combustion chamber to compression. As pistons 3 and 4 reach the uppermost end of their strokes ignition occurs and the cycle of operation is repeated. The upward strokes of pistons 3 and 4, together with the movement of piston 5 to the right, serves to deliver into the crank case space of the engine housing a fresh charge of air, the air being admitted by means of a suitable one-way valve 21.

With the engine operating in the manner just described a maximum fuel economy is obtained. The main power impulses are delivered to the pistons 3 and 4. A secondary power impulse is delivered to piston 5. At the time piston 5 opens the exhaust port 18, the gases are expanded to substantially atmospheric pressure, with the result that a maximum amount of the available energy of expansion in the gases is utilized and at the same time a practically noiseless exhaust is secured. Thus at every revolution of the crank shafts 6 and 7, two power impulses are delivered to the shaft, namely, the principal power impulses derived from pistons 3 and 4, and the secondary impulse derived from piston 5. This tends to produce an extremely uniform power flow from the engine to the main shaft 1.

By operating the engine so that the main shaft 1 rotates in the opposite direction, namely, in a clockwise direction as viewed in Figures 5 to 8, a maximum power output is secured. With this direction of rotation the engine parts assume successively the positions indicated in Figures 5, 8, 7 and 6. After ignition, which takes place with the parts in the position shown in Figure 5, the pistons 3 and 4 descend with the main shaft 1 rotating in a clockwise direction until they reach the position indicated in Figure 8. When the engine operates in this fashion, an exhaust port 22 is provided. This exhaust port must be closed during operation of the engine in the opposite direction as previously described. The gases from the combustion chamber 13 at this point vent through exhaust port 22 and, upon continued rotation of the engine, piston 3 opens port 20 as shown in Figure 7, with the result that the air compressed in the crank case passes up through port 20 to thus scavenge the combustion chamber. Scavenging is assisted by the air ahead of the piston 5 passing up through port 17 into the cylinder space above the piston 4. As piston 5 moves along to the right from its position as shown in Figure 7, it closes port 18 and forces a considerable charge of air ahead of it up through port 17 into combustion chamber 13. This is accomplished by reason of the fact that the movement of piston 5 occurs while piston 4 is passing about dead center, with the result that the stroke of piston 5 is completed, as indicated in Figure 6, before piston 4 closes port 17. With this method of operation, an additional amount of air is forced into combustion chamber 13, with the result that a larger amount of fuel can be burned at each explosion and a consequently larger power output developed. Tests have established that the engine of the present application operated in this fashion develops a greater amount of power for a given weight of engine than any internal combustion engine heretofore produced.

The features of economy of operation, larger power output, simplicity of construction, and the like, are derived chiefly through the particular arrangement and construction of the engine parts and the manner of arranging the cylinders about the center portion 14, in which is provided ports for interconnecting the cylinders during operation to thus derive the benefits of economical operation and large power output. The center portion 14 is of substantially triangular conformation, and the respective pistons reciprocate along its sides. The three cylinders constitute an enclosure about the center portion. With this arrangement, the engine of this application will develop a given power output and will be two-thirds as heavy as an ordinary two-stroke cycle engine of the same power output. A 12 H. P. engine constructed according to this application measures but twelve inches between the opposite faces of the engine housing and has a depth of about 12 inches, so that the entire engine presents the appearance of a small compact block having a centrally extending driving shaft. These engine units may conveniently be used in pairs, and the two units of the pair may be operated respectively on the different principles as above described by arranging the respective units for rotation in opposite directions. Such a combination affords a notable flexibility of operation and is particularly valuable for automobile work. The light weight of the engine is of further advantage in the automotive industry in that it materially reduces the amount of weight which must be transported over the road and in this fashion gives rise to a second source of economy, namely, that the engine has a lesser total vehicle weight to propel.

After the motor is in operation, the port 23 can be closed, and the piston 5 then comes into active operation, serving to carry overhead or prolonging expansion, as described. A port 24 leading into the crank case space is provided for exhausting a portion of the gases compressed ahead of piston 5. The port 24 is uncovered when piston 4 is at the upper extremity of its stroke, as shown in Figure 5, and serves as a relief vent to lower the pressure ahead of the piston 5. The air vented through port 17 is entrapped in the crank case and consequently the energy of compression represented by it is not lost. It can also be discharged into the atmosphere if desired.

In the apparatus as here shown, a port 23 is provided in the cylinder which carries the piston 5. This port is designed for use particularly in starting the engine and in operating the engine under normal load. When the port is open the engine operates substantially as an ordinary two-stroke cycle engine, and the piston 5 merely reciprocates in its cylinder, serving to introduce the charge to the combustion chamber upon movement in one direction and to assist in exhausting the combustion chamber upon movement in the other direction. This feature of operation of the engine is of some importance due to the fact that it may normally be operated with the port 23, and at times when an excess amount of power from the engine is desired, port 23 may be closed with the result that the motor develops an increased power output.

The invention therefore contemplates the provision of an internal combustion engine which develops a maximum power output in an engine of minimum weight. The invention also provides an engine which is possessed of a notable fuel economy, which is of extremely simple construction and capable of manufacture at a correspondingly low cost and which is adaptable without change to all the uses at present served by internal combustion engines. The engine exhibits a marked flexibility of operation by reason of its ability to operate on respectively different principles when rotated in opposite directions. It also embodies means for overloading and for utilizing the heat energy of the power charge to its full extent by prolonging expansion of the gases down to the atmosphere.

Other mechanical advantages realized by this invention are:

Compact and streamline form with small frontal area, short overall length, height and width of engine.

Perfect balance of reciprocating forces within the cylinders, low center of gravity and noiseless operation.

Small number of working parts, absence of valves, cams and other delicate machine parts and ease of dismantling.

The above advantages are in a large part secured by the novel arrangement and construction of the engine parts, as shown.

I claim:

1. An internal combustion engine of the class described comprising three interconnected cylinders forming a continuous chamber disposed about a common center portion of substantially triangular conformation, and power developing pistons reciprocating in said respective cylinders in parallelism with the respective sides of said center portion.

2. An internal combustion engine of the class described comprising a plurality of cylinders forming a continuous chamber grouped about a center portion, power developing pistons reciprocating synchronously in said respective cylinders, and ports interconnecting said respective cylinders for effecting cooperative operation thereof.

3. An internal combustion engine of the class described comprising a housing, three cylinders arranged in substantially triangular conformation about a center portion, a pair of working pistons reciprocating in two of said cylinders, a common combustion chamber for said pistons, a third piston reciprocating in the other of said cylinders, and means for effecting transfer of combustion gases between said respective cylinders during operation of the engine.

4. An internal combustion engine of the class described comprising a housing, three cylinders disposed within said housing in substantially triangular conformation, a center portion surrounded by said cylinders and having formed therein ports for the transfer of gases between said respective cylinders, a pair of working pistons reciprocating in two of said cylinders, and an additional piston reciprocating in the other of said cylinders, said third piston being operated upon by gases derived from said common combustion chamber through the medium of the ports in said central portion.

5. An internal combustion engine of the class described comprising a housing, three cylinders arranged in substantially triangular conformation about a center portion, a pair of working pistons reciprocating in two of said cylinders, a common combustion chamber for said pistons, a third piston reciprocating in the other of said cylinders, means for effecting transfer of combustion gases between said respective cylinders during operation of the engine, and a port in said third cylinder communicable with the atmosphere.

6. An internal combustion engine of the class described comprising a housing, three interconnected cylinders disposed within said housing, pistons operating in said cylinders, a central portion of substantially triangular conformation determined by the walls of said respective cylinders, and ports in said central portion for effecting transfer of combustion gases between certain of said cylinders.

7. An internal combustion engine of the class described comprising a housing, three cylinders arranged in substantially triangular conformation about a center portion; a pair of working pistons reciprocating in two of said cylinders, a common combustion chamber for said pistons, a third piston reciprocating in the other of said cylinders, the relation of the third piston to the other two pistons being such that it accomplishes the major portion of its stroke during the time at which the other two pistons are passing through the extremities of their strokes, and means for effecting transfer of combustion gases between said respective cylinders during the operation of the engine.

In testimony whereof I affix my signature.

ERICH JUNGE.